(12) United States Patent
Stampalia et al.

(10) Patent No.: US 9,794,007 B2
(45) Date of Patent: Oct. 17, 2017

(54) SINGLE RF OSCILLATOR TECHNIQUE FOR BUILT-IN TUNE, TEST, AND CALIBRATION OF A TRANSCEIVER

(71) Applicant: ARM Limited, Cambridge (GB)

(72) Inventors: Anthony Kresimir Stampalia, Sunrise, FL (US); Mario Lafuente, Miami, FL (US)

(73) Assignee: ARM Limited, Cambridge (GB)

( * ) Notice: Subject to any disclaimer, the term of this patent is extended or adjusted under 35 U.S.C. 154(b) by 37 days.

(21) Appl. No.: 15/007,915

(22) Filed: Jan. 27, 2016

(65) Prior Publication Data

US 2017/0005738 A1 Jan. 5, 2017

Related U.S. Application Data

(60) Provisional application No. 62/187,629, filed on Jul. 1, 2015, provisional application No. 62/190,168, filed on Jul. 8, 2015.

(51) Int. Cl.
| | |
|---|---|
| *H04B 17/00* | (2015.01) |
| *H04B 17/14* | (2015.01) |
| *H04L 12/933* | (2013.01) |
| *H04B 1/04* | (2006.01) |

(52) U.S. Cl.
CPC ..... *H04B 17/14* (2015.01); *H04B 2001/0416* (2013.01); *H04B 2001/0491* (2013.01); *H04L 49/109* (2013.01)

(58) Field of Classification Search
CPC ............ H04B 17/14; H04B 2001/0416; H04B 2001/0491; H04L 49/109
See application file for complete search history.

(56) References Cited

U.S. PATENT DOCUMENTS

| | | | |
|---|---|---|---|
| 7,363,563 B1* | 4/2008 | Hissen | H04L 1/243 327/144 |
| 2005/0148304 A1* | 7/2005 | Jerng | H04B 1/30 455/75 |
| 2015/0256272 A1* | 9/2015 | Weissman | H04B 17/13 455/84 |

OTHER PUBLICATIONS

Dabrowski et al., Built-in Loopback Test for IC RF Transceivers,IEEE Transactions on very large integration (VLSI) systems, vol. 18, No. 6, Jun. 2010, pp. 933-946.*

* cited by examiner

*Primary Examiner* — Freshteh N Aghdam
(74) *Attorney, Agent, or Firm* — Leveque IP Law, P.C.

(57) ABSTRACT

Methods and various structures provide for loopback tuning, testing, and calibrating of a transceiver, including: supplying RF drive to both a transmitter and a receiver of the transceiver from one oscillator; applying a modulation waveform to a transceiver block of the transceiver to produce an amplitude-modulated signal; converting a sideband of the amplitude-modulated signal to a baseband signal having a frequency suitable for processing by a receiver digital block, where processing the baseband signal produces a digital output; and performing tuning, testing, and calibrating of the transceiver block, based at least in part on the digital output.

19 Claims, 5 Drawing Sheets

SINGLE RF OSCILLATOR TECHNIQUE FOR BUILT-IN TUNE, TEST, AND CALIBRATION OF A TRANSCEIVER

PRIORITY CLAIM

This application claims the benefit of Provisional Patent Application No. 62/187,629, filed Jul. 1, 2015, and Provisional Patent Application No. 62/190,168, filed Jul. 8, 2015, the contents of which are hereby incorporated by reference in their entirety.

BACKGROUND

A low cost transceiver utilizing frequency modulation in a simplex or time-division duplex system may utilize a single precision oscillator locked to a high precision reference, for normal transmitter or receiver operation. Since transmitter and receiver functions of the transceiver are not simultaneously active in this system, a single oscillator is sufficient for normal operation.

System-on-Chip (SoC) transceivers implement on-chip tune, test and calibration (TTC) circuitry to minimize the cost of external factory equipment that would otherwise be necessary to perform these functions, and to enable these functions to be performed once transceivers are in use in the field. A method used to perform TTC on various stages in the transceiver is to inject a transmit path output into the receive path input, in a so called "loopback" topology, and then re-use receive digital circuitry to perform signal analysis for the TTC. A requirement for a periodic signal to be produced in the receive path and tested by receive digital circuitry during the TTC function, however, cannot be satisfied if the same oscillator is used to directly and simultaneously drive both the transmit and receive paths. An additional and different RF signal is therefore generated to drive the transmit path, exclusively for TTC functions. This additional RF signal may be supplied by an additional oscillator of the transceiver.

The requirement to create an additional high-quality RF signal is a design burden; the additional oscillator required to generate the RF signal adds silicon area (and, therefore, cost), and increases the peak power required to supply the transceiver, due to the power drawn by the additional oscillator and any additional circuitry associated with the oscillator, such as phase-locked loop circuits, during the TTC functions. That additional cost and peak power are associated with a circuit used only in TTC, and not while the transceiver is in normal operation, makes it very desirable to find an alternative to the two oscillator approach.

BRIEF DESCRIPTION OF THE DRAWINGS

The accompanying drawings provide visual representations which will be used to more fully describe various representative embodiments and can be used by those skilled in the art to better understand the representative embodiments disclosed and their inherent advantages. In these drawings, like reference numerals identify corresponding elements.

DETAILED DESCRIPTION

Figure 1:
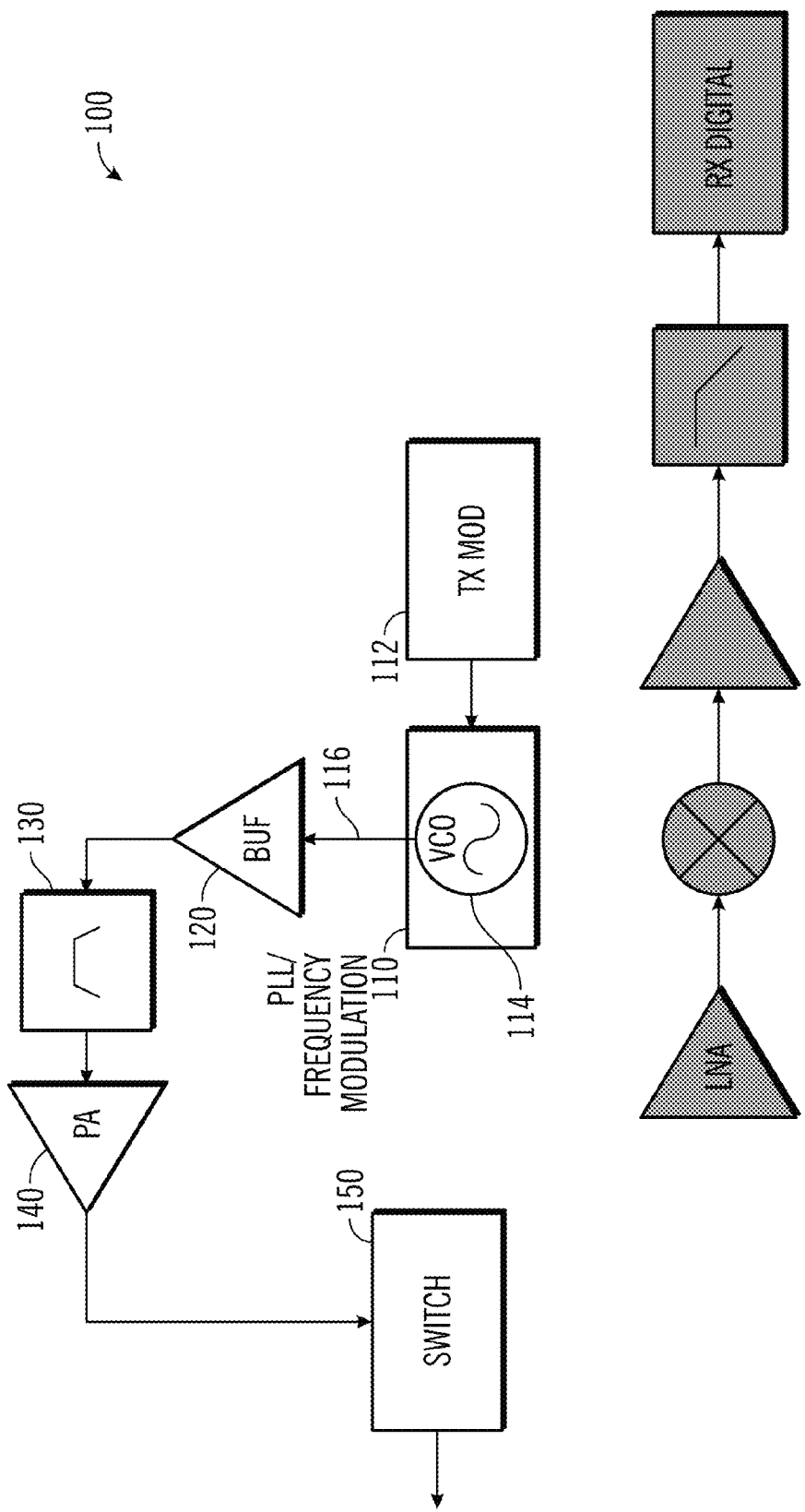
FIG. 1 is a block diagram that illustrates transmit mode of a transceiver, in accordance with various representative embodiments.

The various method, apparatus and devices described herein provide for TTC of a transceiver using one oscillator of the transceiver, thereby eliminating the need for a dedicated oscillator for TTC purposes.

In accordance with certain representative embodiments of the present disclosure, there is provided a method for TTC of a transceiver: supplying RF drive to both a transmitter and a receiver of the transceiver from one oscillator; applying a modulation waveform to a transceiver block of the transceiver to produce an amplitude-modulated signal; converting a sideband of the amplitude-modulated signal to a baseband signal having a frequency suitable for processing by a receiver digital block, where processing the baseband signal produces a digital output; and performing at least one of tuning, testing, and calibrating of the transceiver block, based at least in part on the digital output.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment", "certain embodiments", "an embodiment" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

Referring now to FIG. 1, as shown in diagram 100, when in transmit (TX) mode the voltage controlled oscillator (VCO) 114 of a phase-locked loop (PLL) is coupled to the input of a transmit buffer 120, supplying an RF drive signal 116. PLL/frequency modulation block 110 applies the TX modulating signal 112 directly to the VCO 114 as shown. The output of the transmit buffer 120 is coupled to the input of a transmit filter 130. The output of the transmit filter 130 is coupled to the input of a power amplifier (PA) 140, and the output of the PA is coupled to the TX port of an antenna switch 150 as shown. In TX mode, the antenna switch 150 couples the signal at its TX port to its antenna port. Receive functionality of the transceiver is denoted by the shaded blocks of the drawing.

Figure 2:
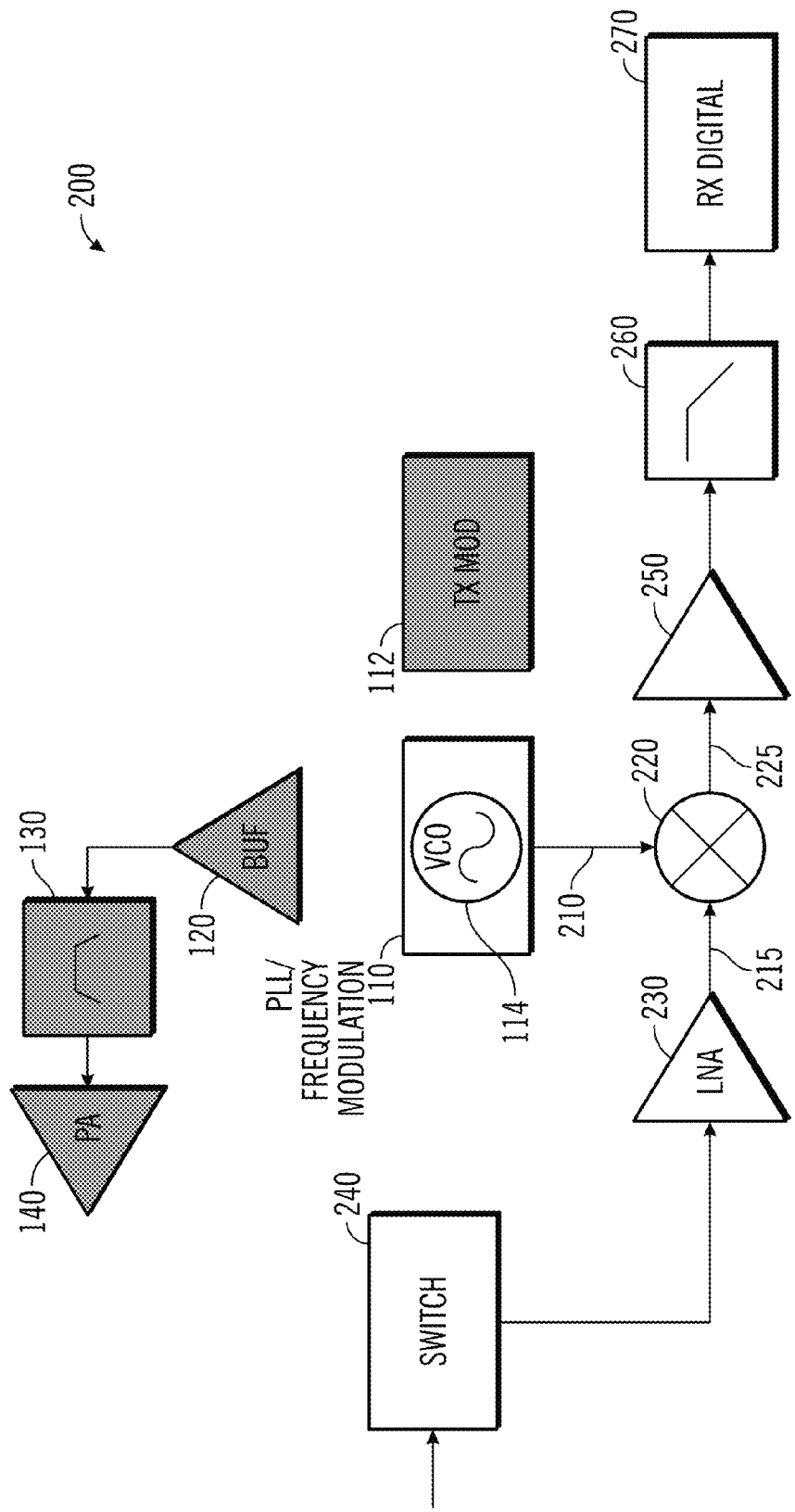
FIG. 2 is a block diagram that illustrates receive mode of a transceiver, in accordance with various representative embodiments.

As shown in diagram 200 of FIG. 2, when in receive (RX) mode the VCO 114 is coupled to the local oscillator (LO) input port of a receive mixer 220, supplying an LO signal 210. For the function of the LO, the frequency modulation function provided by frequency modulation block 110 in the TX path is disabled and VCO 114 is kept locked to a multiple of a precision reference. The RF input port of the mixer 220 is coupled to the output 215 of a low-noise amplifier (LNA) 230 as shown. The input of the LNA 230 is coupled to the RX port of the antenna switch 240. In RX mode, the antenna switch 240 couples the signal at its antenna port to its RX port. An intermediate frequency (IF) output port of the mixer 220 produces a mixer IF output signal 225 that is coupled to the input of an IF gain block 250. The output of the IF gain block 250 is coupled to the input of a baseband filter 260. The output of the baseband filter produces a baseband signal coupled to the RX digital block 270. Transmit functionality of the transceiver is denoted by the shaded blocks of the drawing.

It can be seen that a transceiver (XCVR) in a simplex or time-division duplex (TDD) system utilizes a single precision oscillator, e.g., a VCO locked to a high precision reference, for normal transmitter (TX) or Receiver (RX) operation. Since TX and RX functions of the transceiver are not simultaneously active in this system, a single oscillator (VCO 114) is sufficient for normal operation.

Figure 3:
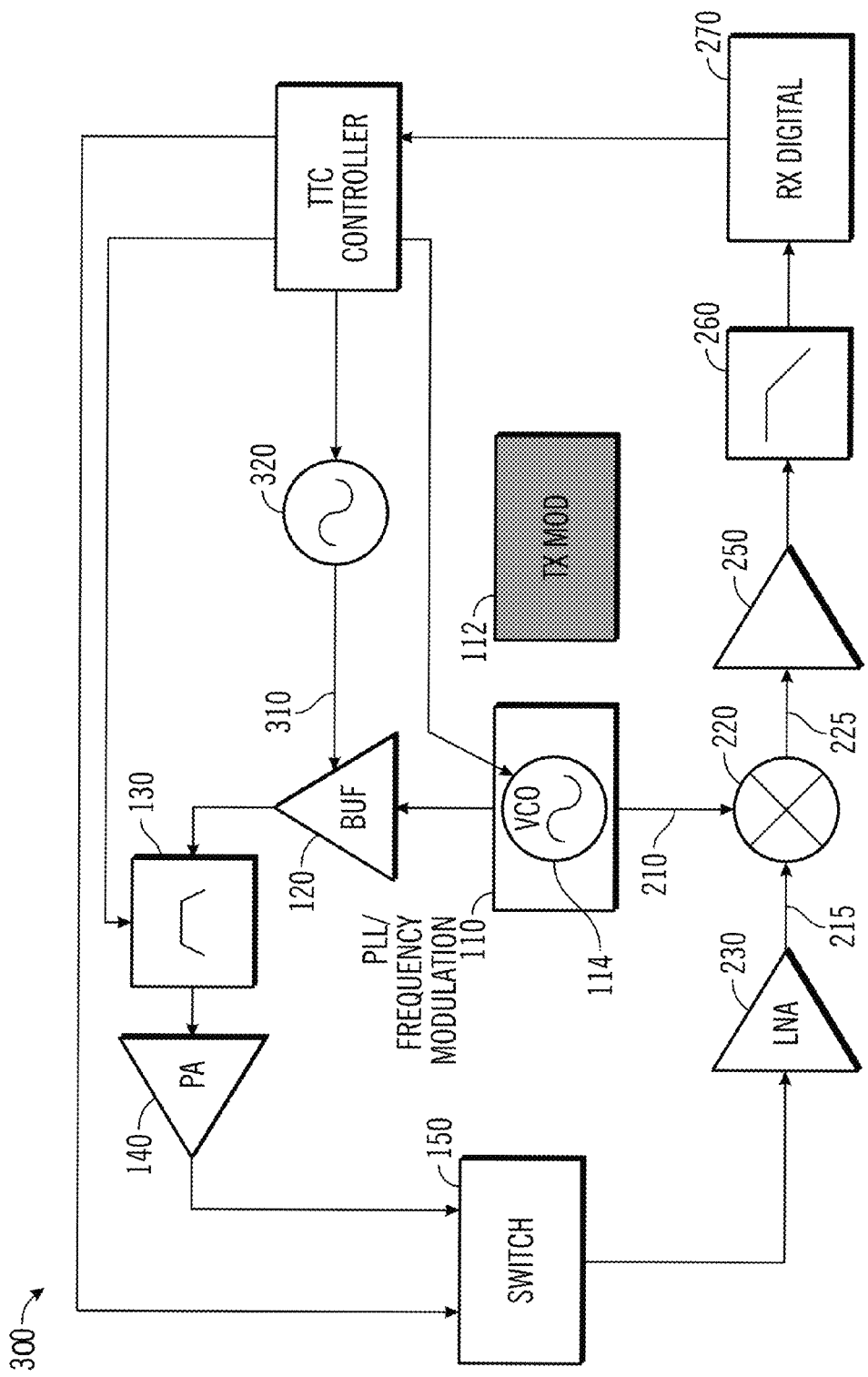
FIG. 3 is a block diagram that illustrates loopback topology used to perform signal analysis during TTC, in accordance with the prior art.

System-on-Chip (SoC) XCVRs implement on-chip tune, test and calibration (TTC) circuitry to provide TTC to be performed on transceiver blocks already in the field and at minimal cost. A method used to perform TTC on various stages in the XCVR is to inject a TX path output into the RX path input, in a so called "loopback" topology, and then re-use the RX digital circuitry to perform signal analysis for the TTC, as shown in the transceiver block diagram 300 of FIG. 3.

A practical baseband signal to be analyzed by the RX digital circuitry is a periodic signal, such as a tone. This requirement for a periodic signal to be produced in the RX path during the TTC function cannot be satisfied if the same oscillator is used to directly and simultaneously drive both the TX path (RF signal) and RX path (LO signal). To produce a periodic baseband signal suitable for TTC purposes at the input to the RX digital block, an additional and different RF signal 310 must be generated to drive the TX path, exclusively for the TTC functions. In order to produce the stable baseband signal of a desired frequency typically required to perform these functions, this additional RF signal 310 must be designed for high frequency accuracy, precision, and stability. Generally, this would be achieved with an additional oscillator 320 controlled with a phase-locked loop coupled to a precision reference available in the system. This requirement to create an additional high-quality RF signal is a design burden; the additional oscillator 320 required to generate the high-quality RF signal 310 adds silicon area (and, therefore, cost), as well as increases the peak power required to supply the XCVR 300, due to the power drawn by the additional oscillator and any additional circuitry associated with the oscillator, such as phase-locked loop circuits, during the TTC functions. The fact that this additional cost and peak power results from a circuit used only in TTC, and not while the XCVR is in normal operation, makes it very desirable to find an alternative, in which loopback TTC of a XCVR is enabled without the requirement for an additional oscillator.

As disclosed herein, the application of amplitude modulation to one or more existing XCVR blocks is provided, enabling reuse of the transmit path oscillator so that the need for a dedicated oscillator for TTC purposes is eliminated. In an example embodiment shown in FIG. 4, this is accomplished by using the same oscillator 114, locked to a precision reference 430, to drive both the RX and TX paths, and by applying a modulation waveform 450 to the enable input of transmit buffer 120. Thus RX LO generation of LO signal 210 is unaffected, while the TX path produces an amplitude-modulated output 460 derived from the same oscillator 114 as that used to drive the RX path. When applying modulation to the enable input of transmit buffer 120, the applied modulation waveform 450 provided by OOK control 410 will substantially enable and disable the TX signal 440 in accordance with the modulation waveform generated by OOK control block 410 in response to the control exerted by TTC controller 420. In this sense, TTC controller 420 provides logic used control the flow of operation of the TX path during a TTC mode. OOK control 410 controls the enable mode of TX buffer 120 and picks a particular waveform to be applied. This approach may be contrasted with a more general TX system utilizing a vector modulator, for example, in which a substantially sinusoidal wave could be applied to the modulator to accomplish the amplitude modulation. In accordance with various embodiments herein, amplitude modulation may be produced by a modulating waveform that may be a series of pulses, a substantially square wave, or a substantially sinusoidal wave, or other periodic baseband signal, by way of example and not limitation.

The spectral location of the modulation sidebands of the TX output 440 are defined by the frequency utilized to substantially enable and disable, or ON-OFF Key (OOK) the TX output signal 440, via the enable control signal 450 provided to the enable input of transmit buffer stage 120. This control signal 450 provided by OOK control block 410 may be a pulse with a programmable rate which can be precisely set from a high precision digital clock (such as that derived from precision reference 430 to phase lock the VCO 114 to a specific RF frequency), thereby producing a TX signal with sidebands at precise, accurate, predictable, and controllable locations. In particular, sidebands may be placed such that, when the TX signal 440 is "looped back" into the RX path at LNA 230, a sideband will be converted in frequency to a baseband frequency suitable for processing by RX digital block 270, which produces a digital output 470. The digital output 470 contains the results of processing of the baseband signal, and may include demodulation and amplitude determination processing results, by way of example and not limitation.

Figure 4:
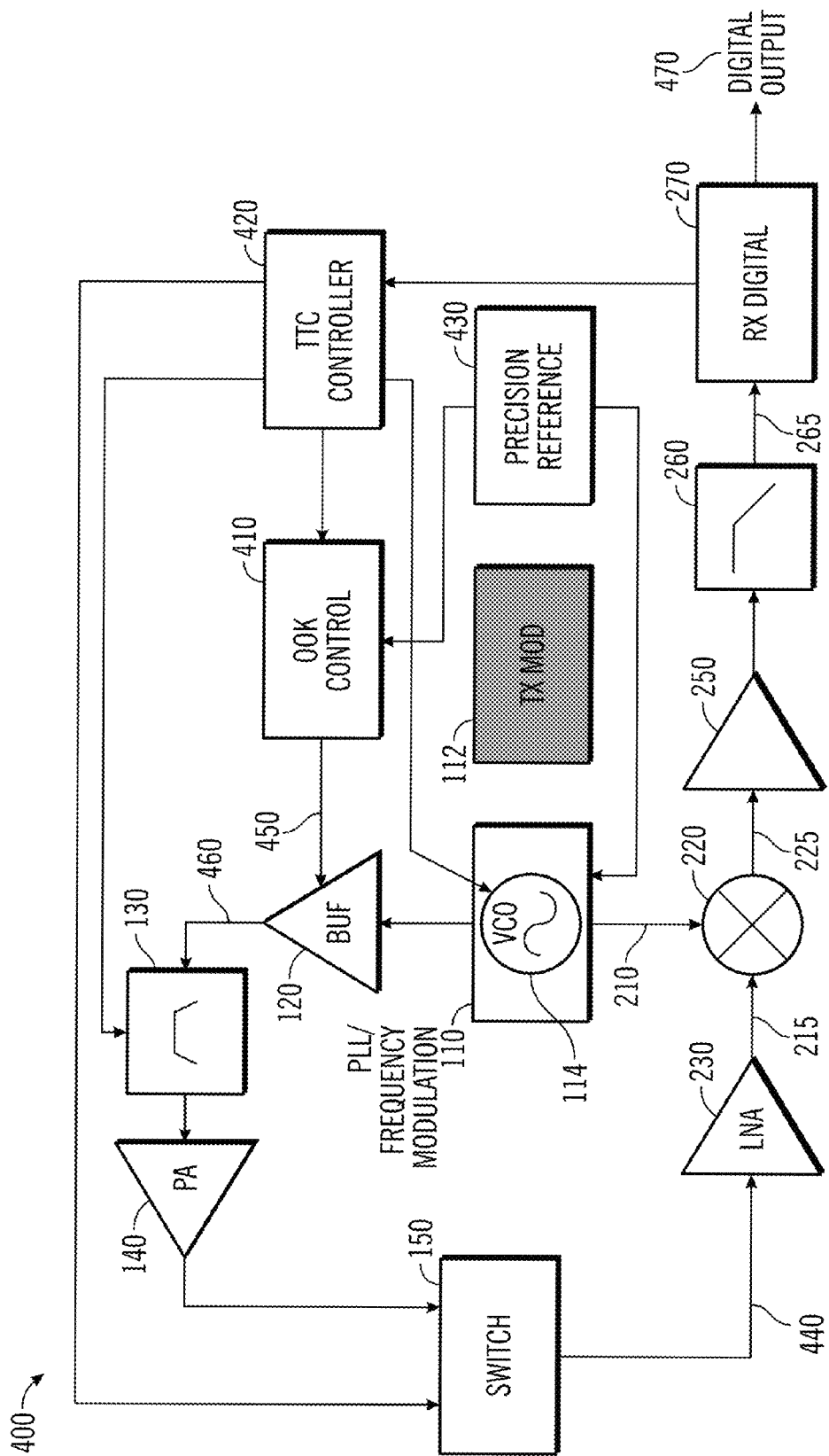
FIG. 4 is a block diagram that illustrates loopback topology used to perform signal analysis during TTC, in accordance with various representative embodiments.

In FIG. 4, oscillator (VCO 114) is an integral part of PLL/frequency modulator 110. The frequency modulator 110 is fed by the transmit data stream 112, which applies instantaneous frequency deviation directly to VCO 114 during normal TX operation. VCO 114 is controlled by a phase locked loop which is coupled to precision frequency reference 430 and keeps the oscillator center frequency locked to a multiple of the precision frequency reference. Oscillator 114 is coupled to both transmit buffer 120 input and the receiver mixer 220 LO port as shown. Transmit buffer 120 has an enable input driven by a modulation waveform 450 received from OOK control block 410. OOK control block 410, in turn, is coupled to TTC controller 420. Additionally, OOK control block 410 is coupled to the same precision frequency reference 430 that drives the phase locked loop of PLL/frequency modulator 110. The amplitude-modulated output 460 of transmit buffer 120 is coupled to the input of transmit filter 130. Transmit filter 130 has an adjustable tuning control input controlled by TTC controller 420 via OOK control 410, e.g., the center frequency of the transmit filter 130 is adjustable in accordance with the control exerted by TTC controller 420 and OOK control 410. The output of transmit filter 130 is coupled to PA 140, and the PA output is coupled to the TX port of antenna switch 150. In loopback mode, antenna switch 150 couples the signal at its TX port to its RX port, which is coupled to the input of LNA 230. The LNA output is coupled to an RF input of receive mixer 220. An IF output port of mixer 220 produces a mixer IF output signal 225 that is coupled to the input of IF gain block 250. The output of IF gain block 250 is coupled to the input of baseband filter 260. The output of baseband filter 260 produces a baseband signal 265 coupled to RX digital block 270. An output of RX digital block 270 is coupled to TTC controller 420. TTC controller 420 is also coupled to the PLL/frequency modulator 110 and directly controls the PLL setting of which oscillator (VCO 114) is a sub-block; TTC controller 420 is also a control input on antenna switch 150 as illustrated. Thus, TTC controller 420 commands the PLL to lock to a specific frequency, and the loop action of the PLL controls the VCO frequency.

By this technique a baseband signal 265 is generated with only a single oscillator. The amplitude of the baseband signal may be analyzed by RX digital block 270, and the result utilized to perform TTC on the XCVR 400. In the loopback block diagram of FIG. 4, it is most beneficial to have the modulated stage located close to the oscillator, so that the modulated signal is available to the maximum number of circuit blocks along the loop that may need TTC; however, the modulation of other blocks not so conveniently located is also contemplated.

Parameters of a transceiver block or transceiver component that may be tuned, tested, or calibrated by the disclosed TTC method include filter center frequencies and bandwidths, block gains, maximum gain, relative power changes (steps), among others. These parameters may be tuned, tested, or calibrated by adjusting any of a voltage, current, resistance, capacitance, and inductance associated with the circuit block of interest. Thus, in accordance with various embodiments, tuning, testing and calibration may be accomplished in at least one or more of the following ways: adjusting a center frequency of a filter; adjusting a bandwidth of a filter; adjusting a gain of a block, which may include adjusting a gain of a transceiver block for a target output level, such as may be required of a PA driver block to produce a desired output power from a PA, or a receiver gain block to best trade sensitivity, blocking, and intermodulation performance; adjusting a gain of a block in order to maximize its output level, as may be desired of an LNA to maximize receiver sensitivity, or a PA to maximize output power; adjusting at least one of a voltage, current, resistance, capacitance, and inductance of a transceiver block, as may be done to maximize power efficiency; adjusting a capacitor value in an interstage impedance-matching circuit for a maximum output level of a transceiver block (e.g., a matching stage between TX driver stages); determining that gain values of a switchable-gain block differ by predetermined amounts, as may be done in PA driver blocks for applications requiring precision PA output power; determining that the transceiver meets predetermined specifications (for example, determining that the PA output power is within specification, or that the gain of an IF gain block varies as required for Automatic Gain Control purposes); and identifying a fault in at least one of the design and manufacture of the transceiver (for example, identifying a design fault resulting in an unbiased LNA, or a tunable capacitor bank in the transmit filter having a manufacturing defect resulting in substantially shifted or non-existent resonance, both examples greatly attenuating the baseband signal reaching the RX digital block during the loopback test).

Figure 5:
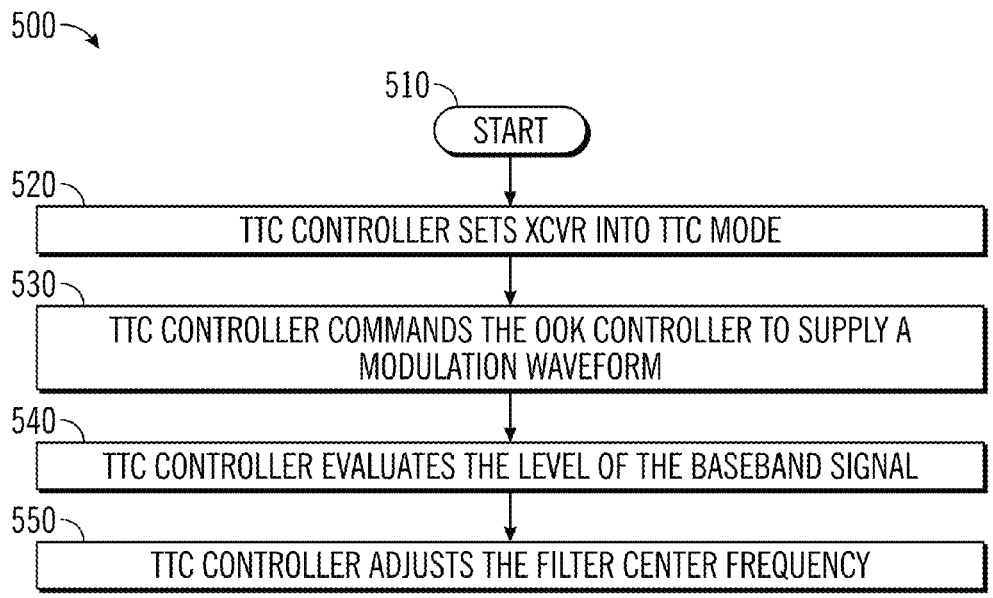
FIG. 5 is a flowchart that illustrates tuning of a transmit filter, in accordance with various representative embodiments.
Figure 6:
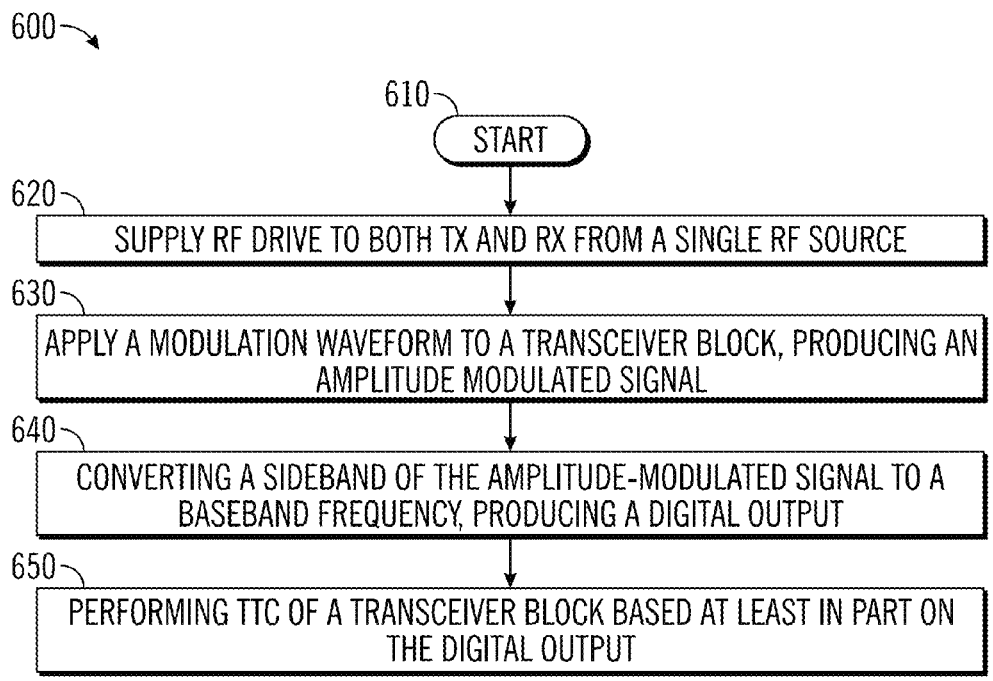
FIG. 6 is a flowchart that illustrates performing TTC of a transceiver, in accordance with various representative embodiments.

A specific example for tuning a transmit filter is shown in the flow chart 500 of FIG. 5, in accordance with various disclosed embodiments disclosed herein. As indicated in FIG. 6, this flow is but one approach that may be employed for performing TTC of a transceiver. Referring now to FIG. 5, flow starts at block 510. At block 520, the TTC controller places the XCVR into TTC loopback mode. This is accomplished by placing the antenna switch in loopback mode (coupling the signal at its TX port to its RX port) and controlling the oscillator (VCO) to drive both the receiver mixer and transmit buffer, thereby supplying RF drive to both the TX and RX of the XCVR. At block 530, the TTC controller controls the OOK control block to supply a modulation waveform to the transmit buffer that will produce a modulation sideband at the desired center frequency of the filter. At block 540, the TTC controller evaluates the level of the baseband signal, as reported by the RF digital block. At block 550, the TTC controller adjusts the filter center frequency, e.g., by adjusting a value of a capacitor in the filter, for example, and then re-evaluates the level of the baseband signal at block 560. As discussed above, the TTC controller may perform TTC of the transceiver using various other approaches, all of which are based at least in part on the RX digital output.

An overall flow of the embodiments disclosed herein is shown in FIG. 6. Flow starts at block 610. At block 620, RF drive is supplied to both TX and RX paths from one oscillator. Next, at block 630, a modulation waveform is applied to a transceiver block, producing an amplitude-modulated signal. As described above, the modulation waveform applied may be a series of pulses, a substantially square wave, and a substantially sinusoidal wave, for example. At block 640, a sideband of the amplitude-modulated signal is converted to a baseband frequency suitable for processing by a receiver digital block of the receiver, producing a digital output. At block 650, TTC is performed, meaning that at least one of tuning, testing, and calibrating of a transceiver block (component) is performed, based at least in part on the RX digital output.

Those skilled in the art will recognize that the present disclosure has been described in terms of example embodiments based upon use of a programmed processor. However, the invention should not be so limited, since the present disclosure could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present disclosure.

Moreover, those skilled in the art will further appreciate that a program flow and associated data used to implement the embodiments described above can be implemented using various forms of storage such as Read Only Memory (ROM), Random Access Memory (RAM), Electrically Erasable Programmable Read Only Memory (EEPROM); non-volatile memory (NVM); mass storage such as a hard disc drive, floppy disc drive, optical disc drive; optical storage elements, magnetic storage elements, magneto-optical storage elements, flash memory, core memory and/or other equivalent storage technologies without departing from the present disclosure. Such alternative storage devices should be considered equivalents.

Various embodiments described herein are implemented using programmed processors executing programming instructions that are broadly described in flow chart form that can be stored on any suitable electronic storage medium or transmitted over any suitable electronic communication medium. However, those skilled in the art will appreciate that the processes described above can be implemented in any number of variations and in many suitable programming languages without departing from the present disclosure. For example, the order of certain operations carried out can often be varied, additional operations can be added or operations can be deleted without departing from the disclosure. Error trapping can be added and/or enhanced and variations can be made in user interface and information presentation without departing from the present disclosure. Such variations are contemplated and considered equivalent.

The representative embodiments, which have been described in detail herein, have been presented by way of example and not by way of limitation. It will be understood by those skilled in the art that various changes may be made in the form and details of the described embodiments resulting in equivalent embodiments that remain within the scope of the appended claims.

Accordingly, some features of the disclosed embodiments are set out in the following numbered items:

1. A method for loopback tuning, testing, and calibrating (TTC) of a transceiver, comprising:
    supplying RF drive to both a transmitter and a receiver of the transceiver from one oscillator;
    applying a modulation waveform to a transceiver block of the transceiver to produce an amplitude-modulated signal;
    converting a sideband of the amplitude-modulated signal to a baseband signal having a frequency suitable for processing by a receiver digital block, where processing the baseband signal produces a digital output; and
    performing at least one of tuning, testing, and calibrating of the transceiver block, based at least in part on the digital output.
2. The method of item 1, further comprising:
    prior to supplying RF drive:
        a TTC controller setting the transceiver into a TTC mode; and
    prior to applying the modulation waveform:
        the TTC controller controlling a controller to supply the modulation waveform.
3. The method of item 2, where setting the transceiver into the TTC mode comprises:
    placing an antenna switch of the transceiver in loopback mode by coupling a signal at a transmitter (TX) port of the antenna switch to a receiver (RX) port of the antenna switch; and
    controlling the one oscillator to drive both a receiver mixer and a transmit buffer of the transceiver; and
    where the TTC controller controlling a controller to supply a modulation waveform comprises:
        controlling an OOK control block to supply the modulation waveform to the transmit buffer to produce a modulation sideband at a desired center frequency of a transmit filter.
4. The method of item 2, further comprising:
    the TTC controller adjusting a center frequency of a transmit filter; and
    re-evaluating the adjusted baseband signal.
5. The method of item 1, where applying the modulation waveform to a transceiver block comprises applying the modulation waveform to an enable input of the transceiver block.
6. The method of item 1, where the modulation waveform is a series of pulses.
7. The method of item 1, where the modulation waveform is a substantially square wave.
8. The method of item 1, where the modulation waveform is a substantially sinusoidal wave.
9. The method of item 1, where performing the at least one of tuning, testing, and calibrating comprises adjusting a center frequency of a filter.
10. The method of item 1, where performing the at least one of tuning, testing, and calibrating comprises adjusting a bandwidth of a filter.
11. The method of item 1, where the at least one of tuning, testing, and calibrating comprises adjusting a gain of the transceiver block.
12. The method of item 11, where the adjusting the gain of the transceiver block comprises adjusting at least one of a voltage, current, resistance, capacitance, and inductance of the transceiver block.
13. The method of item 11, where adjusting the gain of the transceiver block is performed for a target output level.
14. The method of item 1, where the at least one of tuning, testing, and calibrating comprises adjusting a capacitor value for a maximum output level of the transceiver block.
15. The method of item 1, where the at least one of tuning, testing, and calibrating comprises determining that gain values of a switchable-gain block differ by predetermined amounts.
16. The method of item 1, where the at least one of tuning, testing, and calibrating comprises determining that the transceiver meets predetermined specifications.

17. The method of item 1, where the at least one of tuning, testing, and calibrating comprises identifying a fault in at least one of the design and manufacture of the transceiver.
18. The method of item 1, where the one oscillator is a voltage controlled oscillator.
19. The method of item 1, where the transmitter of the transceiver is frequency modulated.

What is claimed is:

1. A method for loopback tuning, testing, and calibrating (TTC) of a transceiver, comprising:
    supplying RF drive to both a transmitter and a receiver of the transceiver from one oscillator;
    applying a modulation waveform to a transceiver block of the transceiver to produce an amplitude-modulated signal;
    converting a sideband of the amplitude-modulated signal to a baseband signal having a frequency suitable for processing by a receiver digital block, where processing the baseband signal produces a digital output; and
    performing at least one of tuning, testing, and calibrating of the transceiver block, based at least in part on the digital output.

2. The method of claim 1, further comprising:
    prior to supplying RF drive:
        a TTC controller setting the transceiver into a TTC mode; and
    prior to applying the modulation waveform:
        the TTC controller controlling a controller to supply the modulation waveform.

3. The method of claim 2, where setting the transceiver into the TTC mode comprises:
    placing an antenna switch of the transceiver in loopback mode by coupling a signal at a transmitter (TX) port of the antenna switch to a receiver (RX) port of the antenna switch; and
    controlling the one oscillator to drive both a receiver mixer and a transmit buffer of the transceiver; and
    where the TTC controller controlling a controller to supply a modulation waveform comprises:
        controlling an On-Off Key (OOK) control block to supply the modulation waveform to the transmit buffer to produce a modulation sideband at a desired center frequency of a transmit filter.

4. The method of claim 2, further comprising:
    the TTC controller adjusting a center frequency of a transmit filter to produce an adjusted baseband signal; and
    re-evaluating the adjusted baseband signal.

5. The method of claim 1, where applying the modulation waveform to a transceiver block comprises applying the modulation waveform to an enable input of the transceiver block.

6. The method of claim 1, where the modulation waveform is a series of pulses.

7. The method of claim 1, where the modulation waveform is a substantially square wave.

8. The method of claim 1, where the modulation waveform is a substantially sinusoidal wave.

9. The method of claim 1, where performing the at least one of tuning, testing, and calibrating comprises adjusting a center frequency of a filter.

10. The method of claim 1, where performing the at least one of tuning, testing, and calibrating comprises adjusting a bandwidth of a filter.

11. The method of claim 1, where the at least one of tuning, testing, and calibrating comprises adjusting a gain of the transceiver block.

12. The method of claim 11, where the adjusting the gain of the transceiver block comprises adjusting at least one of a voltage, current, resistance, capacitance, and inductance of the transceiver block.

13. The method of claim 11, where adjusting the gain of the transceiver block is performed for a target output level.

14. The method of claim 1, where the at least one of tuning, testing, and calibrating comprises adjusting a capacitor value for a maximum output level of the transceiver block.

15. The method of claim 1, where the at least one of tuning, testing, and calibrating comprises determining that gain values of a switchable-gain block differ by predetermined amounts.

16. The method of claim 1, where the at least one of tuning, testing, and calibrating comprises determining that the transceiver meets predetermined specifications.

17. The method of claim 1, where the at least one of tuning, testing, and calibrating comprises identifying a fault in at least one of design and manufacture of the transceiver.

18. The method of claim 1, where the one oscillator is a voltage controlled oscillator.

19. The method of claim 1, where the transmitter of the transceiver is frequency modulated.

* * * * *